United States Patent
Srivastava et al.

(10) Patent No.: US 12,363,180 B2
(45) Date of Patent: Jul. 15, 2025

(54) CALL RECORDING CONTINUITY AFTER RESTART OF A CALL RECORDING SYSTEM

(71) Applicant: Oracle International Corporation, Redwood City, CA (US)

(72) Inventors: Rajat Srivastava, Kadubesenhalli (IN); Rohit Juneja, Stittsville (CA)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 18/499,512

(22) Filed: Nov. 1, 2023

(65) Prior Publication Data
US 2025/0141943 A1 May 1, 2025

(51) Int. Cl.
*H04L 65/1104* (2022.01)
(52) U.S. Cl.
CPC ................................ *H04L 65/1104* (2022.05)
(58) Field of Classification Search
None
See application file for complete search history.

(56) References Cited

U.S. PATENT DOCUMENTS

| | | | |
|---|---|---|---|
| 2011/0075653 A1* | 3/2011 | Potts | H04L 65/1069 370/352 |
| 2017/0289349 A1* | 10/2017 | Ou | H04M 3/567 |
| 2018/0167420 A1* | 6/2018 | Shukla | H04L 65/1045 |
| 2020/0028896 A1* | 1/2020 | Veldanda | H04L 67/1014 |

* cited by examiner

*Primary Examiner* — Fadi Haj Said

(57) ABSTRACT

The technology disclosed herein enables continuity of a call recording when a recording system restarts. In a particular example, a method includes establishing a recording session between a session recording client and a session recording system. The recording session is associated with a communication session being recorded. The method also includes periodically transmitting requests for counter values from the session recording system. The counter value indicates a number of times the session recording system has restarted. The method further includes receiving a first counter value of the counter values from the session recording system and receiving subsequent counter values of the counter values from the session recording system after receiving the first counter value. In response to determining that one of the subsequent counter values does not match the first counter value, the method includes ending the recording session.

20 Claims, 7 Drawing Sheets

CALL RECORDING CONTINUITY AFTER RESTART OF A CALL RECORDING SYSTEM

BACKGROUND

Session Initiation Protocol (SIP) Recording (SIPREC) is a standardized protocol designed for the purpose of recording multimedia sessions, particularly voice and video calls over Internet Protocol (IP) networks. SIPREC was developed to address the growing need for a standardized method of capturing and storing communication sessions in real-time, ensuring compliance with legal and regulatory requirements, as well as facilitating quality assurance and dispute resolution in various industries. It is widely utilized in the realm of Voice over Internet Protocol (VoIP) and Unified Communications (UC) environments, providing a robust and interoperable framework for recording communication sessions across different vendors' equipment and platforms.

One of the primary reasons SIPREC is commonly used to record calls is its ability to seamlessly integrate with SIP-based communication systems. SIP is a widely adopted protocol for initiating, modifying, and terminating real-time sessions that involve video, voice, messaging, and other communications applications and services. SIPREC extends the capabilities of SIP by defining a standardized interface for call recording, allowing recording systems to efficiently capture and store media streams, metadata, and signaling information associated with communication sessions. This standardized approach simplifies the deployment of recording solutions, promotes interoperability among different vendors' equipment, and ensures that recorded sessions can be played back accurately, even if the recording and playback systems come from different manufacturers. Ultimately, SIPREC serves as a crucial tool in maintaining compliance, enhancing communication security, and enabling organizations to meet their regulatory obligations related to call recording.

A SIPREC recording system typically receives call communications and records the received communications. The SIPREC clients sending those communications do not receive feedback on the status of the recording systems. Should something happen to cause a recording system to fail, a call recording being produced prior to the failure may not continue automatically upon restart (i.e., the recording system may have no mechanism to remember recordings being produced prior to failure). The clients will be unaware of the failure and will continue to send the communications for recording. Upon receiving the communications after such a failure, the restarted recording system will simply discard the communications because they are not associated with any recording currently in progress. Thus, a recording for the call may not be produced unbeknownst to the systems and participants on the call who may be expecting a call recording.

SUMMARY

The technology disclosed herein enables continuity of a call recording when a recording system restarts. In a particular example, a method includes establishing a recording session between a session recording client and a session recording system. The recording session is associated with a communication session being recorded. The method also includes periodically transmitting requests for counter values from the session recording system. The counter value indicates a number of times the session recording system has restarted. The method further includes receiving a first counter value of the counter values from the session recording system and receiving subsequent counter values of the counter values from the session recording system after receiving the first counter value. In response to determining that one of the subsequent counter values does not match the first counter value, the method includes ending the recording session.

In other examples, an apparatus performs the above-recited method and program instructions stored on computer readable storage media direct a processing system to perform the above-recited method.

DETAILED DESCRIPTION

The recording clients described below recognize when a recording system restarts and initiate new recording sessions. When a recording system restarts, the recording sessions that were active prior to the restart no longer exist from the perspective of the recording system. Any recording produced from those recording sessions up until the restart may also be discarded. If a recording client was to continue sending communications over a recording session established prior to the restart, the recording system will ignore those communications for not being associated with any active recording session. The recording client will, therefore, initiate a new recording session with the recording system and start sending the communications over that new recording session. Since the recording system is now receiving the communications over an active recording session, the recording system records those communications. Even if a portion of the call recording made prior to the restart is lost, at least the call will be recorded going forward.

Figure 1:
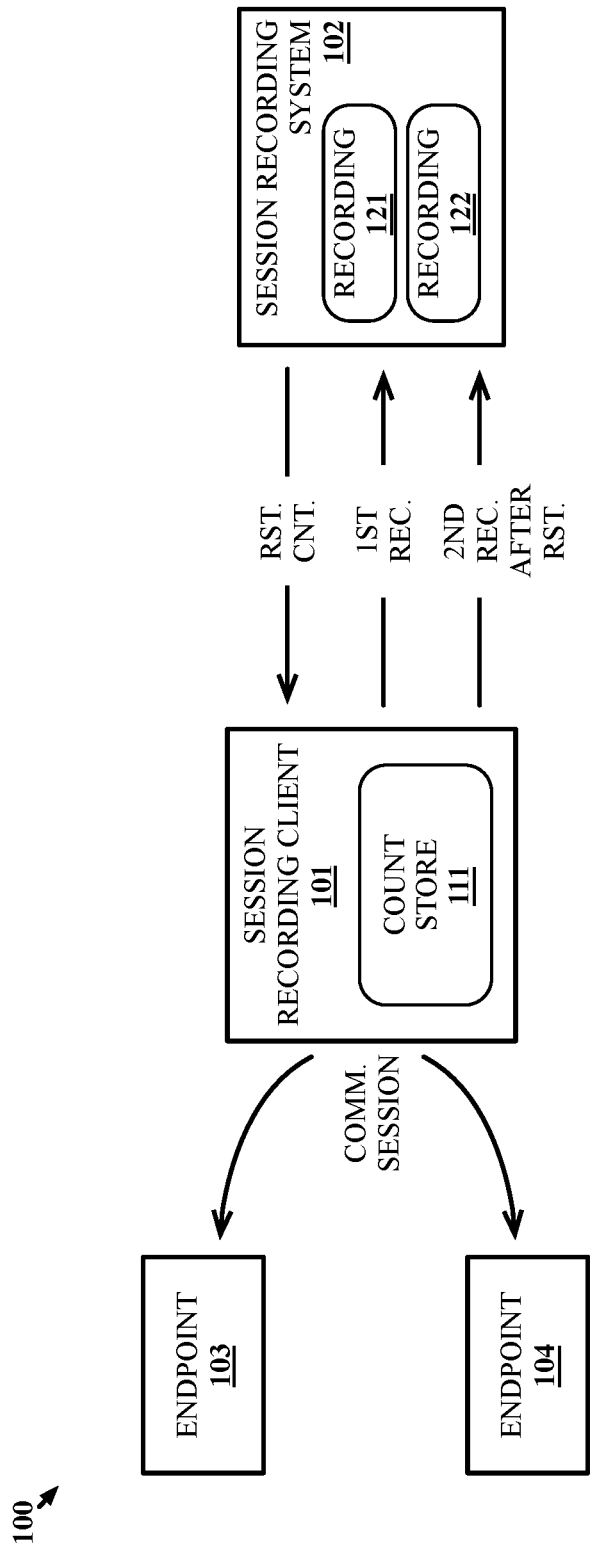
FIG. 1 illustrates an implementation for providing call recording continuity upon restart of a call recording system.

FIG. 1 illustrates implementation 100 for providing call recording continuity upon restart of a call recording system. Implementation 100 includes session recording client 101, session recording system 102, and endpoints 103-104. Session recording client 101 is implemented in a communication system through which communications between endpoint 103 and endpoint 104 are exchanged. In some examples, one of endpoints 103-104 may be session recording client 101 rather than an intermediate system on the communication path. Though not shown, it should be understood that session recording client 101, session recording system 102, and endpoints 103-104 communicate over various wired and/or wireless communication links. The communication links maybe direct links or may include intervening systems, networks, and/or devices.

Endpoints 103-104 may include telephones, smartphones, laptop computers, desktop computers, tablets, or other type of user-operable communication device—including combinations thereof. One or more of endpoints 103-104 may also include a communication system that bridges communications between session recording client 101 and a user-operable device. For example, analog communications with a circuit-switched telephone may be bridged by the endpoint to packet-based communications with session recording client 101.

Session recording system 102 is a communication system with which session recording clients, such as session recording client 101, establish call recording sessions. Although implementation 100 only includes one session recording client, session recording system 102 may service multiple session recording clients. Similarly, multiple session recording systems may exist with which session recording client 101 may establish call recording sessions. The recording sessions may be established using SIPREC or may be established using some other protocol for initiating call recording sessions. When a recording session is established with session recording system 102, a call recording is created in association with the session. Communications received over the session are stored in the created call recording until a session takedown message (e.g., a SIP BYE message) is received by session recording system 102 from session recording client 101. If everything goes well and session recording system 102 does not restart mid recording session, the created recording session will be available for access from session recording system 102. Session recording system 102 may store the call recordings in local storage, network connected storage, or some combination of the two.

Figure 2:
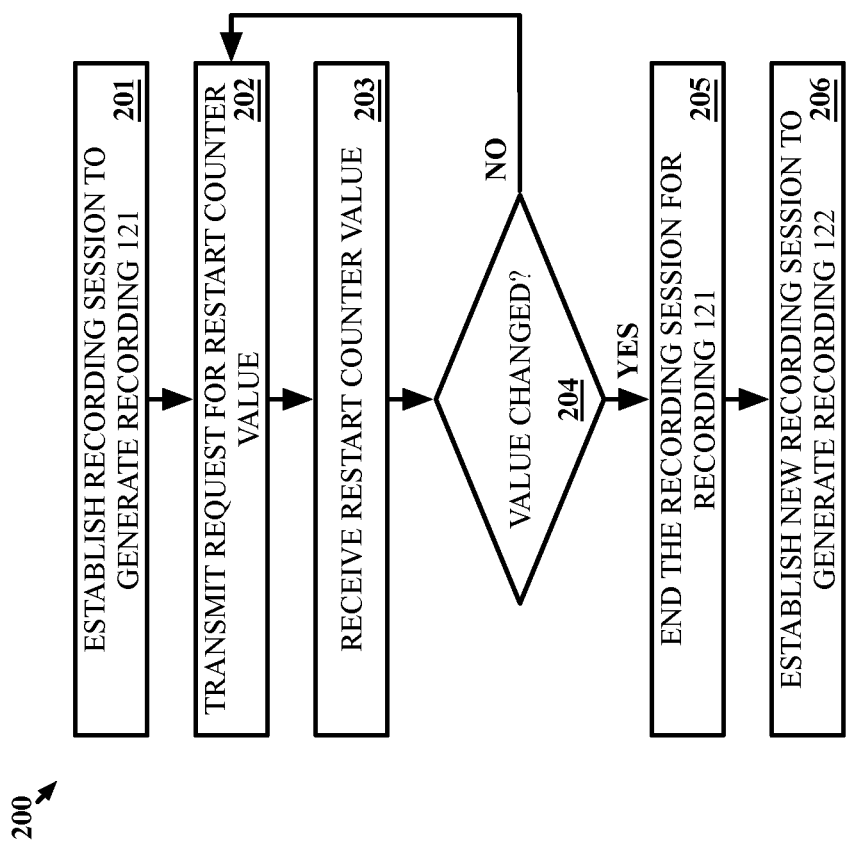
FIG. 2 illustrates an operation to provide call recording continuity upon restart of a call recording system.

FIG. 2 illustrates operation 200 to provide call recording continuity upon restart of a call recording system. Operation 200 is an example of what session recording client 101 may do when something happens causing session recording system 102 to restart while recording call communications received from session recording client 101. In operation 200, session recording client 101 establishes a recording session with session recording system 102 (Step 201). In this example, call recording 121 is created to store the call communications received from session recording client 101 for the communication session between endpoint 103 and endpoint 104. While only two endpoints are on the communication session in this example, communications sessions may occur between any number of two or more endpoints.

The recording session may be established using SIPREC or some other protocol for initiating call recording sessions. The recording session is established to record user communications exchanged between endpoint 103 and endpoint 104 over a communication session established between endpoint 103 and endpoint 104. The communication session may be established using SIP or some other session initiating protocol and may include audio (e.g., voice), video, or some other type of real-time communication mode. Session recording client 101 may forwards session signaling between endpoint 103 and endpoint 104 to establish a communication session between endpoint 103 and endpoint 104. In other examples, the communication session between endpoint 103 and endpoint 104 may include multiple communication sessions if a single communication session does not pass through session recording client 101 (e.g., a first session established between endpoint 103 and session recording client 101 and a second session established between endpoint 104 and session recording client 101). The user communications exchanged between endpoint 103 and endpoint 104 may be packets exchanged using Real-time Transfer Protocol (RTP) or may be packets exchanged using some other type of real-time packet communication protocol. The packets received by session recording client 101 may be transmitted by session recording client 101 to session recording system 102 over the recording session unmodified (e.g., session recording client 101 may forward RTP packets received from endpoint 103 and endpoint 104 as is to session recording system 102). Alternatively, session recording client 101 may modify (e.g., reformat) the packets or the user communications carried therein for recording by session recording system 102.

Session recording client 101 periodically transmits requests for counter values from the session recording system (Step 202). The counter value indicates a number of times the session recording system has restarted at the time the request is received. Preferably, session recording client 101 transmits a first request at substantially the same time as the recording session is established. If session recording client 101 waits too long between establishing the recording session and requesting the first counter value, session recording system 102 may have restarted between the recording session's establishment and receipt of the counter value. In that scenario, session recording client 101 would not recognize that session recording system 102, as explained below. Session recording client 101 would, therefore, continue to send communications to session recording system 102 even though session recording system 102 will not recognize them as being associated with an active recording session.

Session recording client 101 receives a first counter value from session recording system 102 in response to the first request from session recording system 102 (Step 203). The first counter value is stored in restart count store 111 of session recording client 101. Restart count store 111 may be a data structure that tracks the restart count associated with each active recording session at session recording client 101 since session recording client 101 may be handling more communication sessions than the session between endpoint 103 and endpoint 104. The first counter value is used as a baseline for determining whether session recording system 102 restarts during the recording session. The counter value indicates a number of times session recording system 102 has restarted. Session recording system 102, therefore, keeps track of the number of times it has restarted (e.g., may store value in persistent memory and increment the value by one with each restart). The counter value may be a number of all-time restarts, number of restarts from a specified point in time (e.g., in the last calendar day, a number of restarts since a most recent upgrade of session recording system 102, or since some other reference point. As such, the first counter value could be 0 or any number above that depending on how many restarts have occurred for session recording system 102.

Requests for counter values and responses to those requests may be transmitted using messages already defined by the recording session protocol used to establish the recording session. For example, SIPREC provides a message type called SIP OPTIONS. Information can be added to a header of a SIP OPTIONS message. In this case, a header for the restart count may be included in the SIP OPTIONS message. The header in the SIP OPTIONS message from session recording client 101 may explicitly request the restart count from session recording system 102 or session recording system 102 may be configured to respond with its restart count whenever a SIP OPTIONS message is received. In some examples, session recording client 101 may include its own restart count, maintained in a manner similar to session recording system 102. Session recording system 102 responses to the SIP OPTIONS message by transmitting a SIP OPTIONS 200 OK response message to session recording client 101. The SIP OPTIONS 200 OK response message includes a header for the restart counter value of session recording system 102. Session recording client 101 reads the header in the SIP OPTIONS 200 OK response to retrieve the restart count.

Session recording client 101 determines whether the restart counter value has changed from a restart counter value stored in restart count store 111 (Step 204). Since session recording client 101 has only received the first response for this recording session, there is no value in restart count store 111 from a prior response. Thus, the value has not changed and operation 200 returns to step 202. Upon returning to step 202, session recording client 101 waits for the expiration of a timer defining the period for session recording client 101 to send the periodic requests. For example, the period may be set at 500 milliseconds. In that case, session recording client 101 will send out a request every 500 milliseconds assuming the value received from session recording system 102 has not changed at step 204. Other timer values may be used instead. Should session recording client 101 receive a response from session recording system 102 including a restart count that differs for the communication session than the value stored in restart count store 111, session recording client 101 recognizes that session recording system 102 has restarted.

In response to session recording client 101 determining that session recording system 102 has restarted, session recording client 101 ends the recording session for call recording 121 associated with the communication session between endpoint 103 and endpoint 104 (Step 205). Session recording client 101 may send a message (e.g., a SIP BYE message) to session recording system 102 to end the recording session but, since session recording system 102 is unaware of the recording session after restart, such a message is likely unnecessary. Thus, session recording client 101 may simply stop sending the user communications to session recording system 102 via the session.

While operation 200 could stop there with session recording client 101 no longer sending user communications over the session but, in this example, session recording client 101 takes action to continue the recording of the user communications between endpoint 103 and endpoint 104. Specifically, session recording client 101 establishes a new recording session with session recording system 102 (Step 206). The new recording session triggers session recording system 102 to create call recording 122 in which the user communications will be stored. Call recording 122 is created because call recording 121 no longer exists since it was associated with a recording session that ended due to session recording system 102's restart. As far as session recording system 102 is concerned, the new recording session with session recording client 101 is just like any other recording session. Session recording system 102 is unaware that the communication session was previously being recorded. In some examples, multiple recording systems may be available to session recording client 101. The new recording session may be established with another recording system rather than being established with session recording system 102.

While call recording 121 is discarded by session recording system 102 due to session recording system 102 restarting in the above example, session recording system 102 may be able to keep call recording 121 in other examples. For instance, session recording system 102 may store call recording 121 to an area of storage that can be checked after restart. If necessary, session recording system 102 may then format call recording 121 such that call recording 121 can still be accessed later on (e.g., the in-process recording may be formatted differently than a completed recording). In further examples, an identifier for the communication session between endpoint 103 and endpoint 104 may be provided to session recording system 102 so that session recording system 102 can associate call recording 121 with call recording 122. In those examples, session recording system 102 may combine call recording 121 and call recording 122 into a single recording.

Advantageously, since session recording client 101 was able to recognize that session recording system 102 restarted, session recording client 101 could restart the recording of the user communications between endpoint 103 and endpoint 104 by establishing a new recording session. Even though call recording 121 may be lost due to the restart, at least the user communications after establishing the new recording session are captured in call recording 122. In some examples, the participants on the communication session may be notified that call recording 121 was lost so that things can be repeated for capture in call recording 122 if desired.

Figure 3:
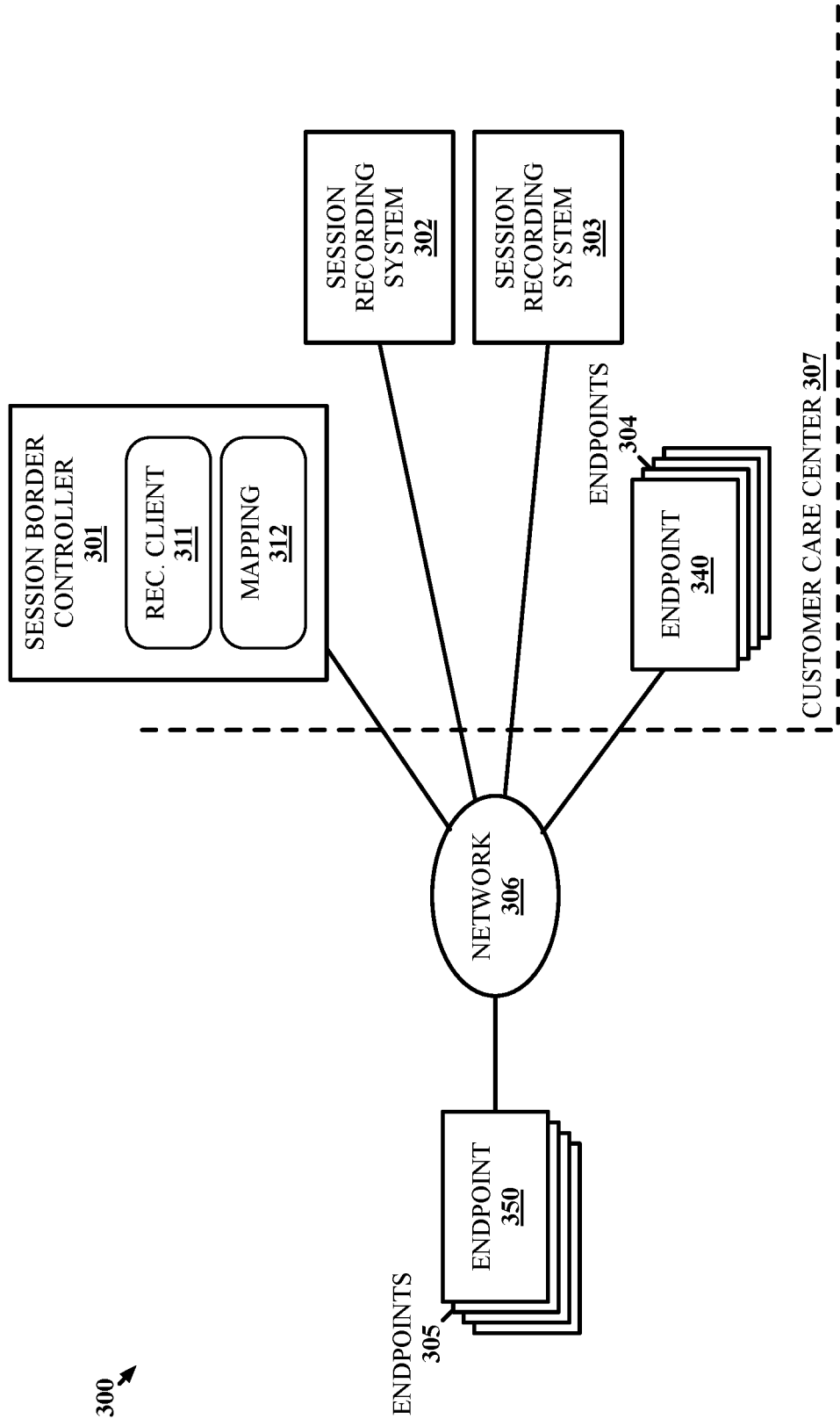
FIG. 3 illustrates an implementation for providing call recording continuity upon restart of a call recording system.

FIG. 3 illustrates implementation 300 for providing call recording continuity upon restart of a call recording system. Implementation 300 includes session border controller 301, session recording system 302, session recording system 303, endpoints 304, endpoints 305, and network 306. Session border controller 301, session recording systems 302-303, and endpoints 304 are part of customer care center 307. Although, all elements of customer care center 307 need not be collocated. Network 306 includes one or more local or wide area networks, including the Internet. In some examples, at least a portion of network 306 may be considered part of customer care center 307 (e.g., may be an enterprise network connecting session recording system 302, session recording systems 302-303, and endpoints 304).

Customer care center 307 is a contact center that handles calls to assist customers. Endpoints 304 are operated by agents of an entity (e.g., business) associated with customer care center 307. The entity may have a vested interest in monitoring calls between agents and customers to ensure customers are being handled properly. As such, customer care center 307 is configured to use session recording systems 302-303 to record calls. The call recordings can later be used for reference, as examples for training purposes, as evidence for what a customer was told, or for some other reason.

Calls with customer care center 307 pass through session border controller 301. Session border controller 301 is a system ensuring secure and seamless communication with endpoints 304 of customer care center 307. Customer care center 307 manages and controls the initiation, maintenance, and termination of sessions. Session border controller 301 may enhance operational efficiency of customer care center 307 by providing features such as protocol normalization, call admission control, and network address translation. Session border controller 301 may safeguard customer care center 307 against potential security threats, including denial-of-service attacks and eavesdropping, while also facilitating the interoperability of diverse communication technologies. In some examples, customer care center 307 may employ more than one session border controller that will operate similarly to session border controller 301 to record calls using session recording systems 302-303.

In this example, since communications with endpoints 304 pass through session border controller 301, session border controller 301 includes session recording client 311 to provide call recording services for customer care center 307. Session recording client 311 uses SIPREC to establish sessions with session recording systems 302-303. Session recording systems 302-303 may both be active and session border controller 301 may distribute recording sessions between the two. In other examples, one of session recording systems 302-303 may be standby and may only accept session requests when the active system cannot (e.g., is down or overloaded).

Figure 4:
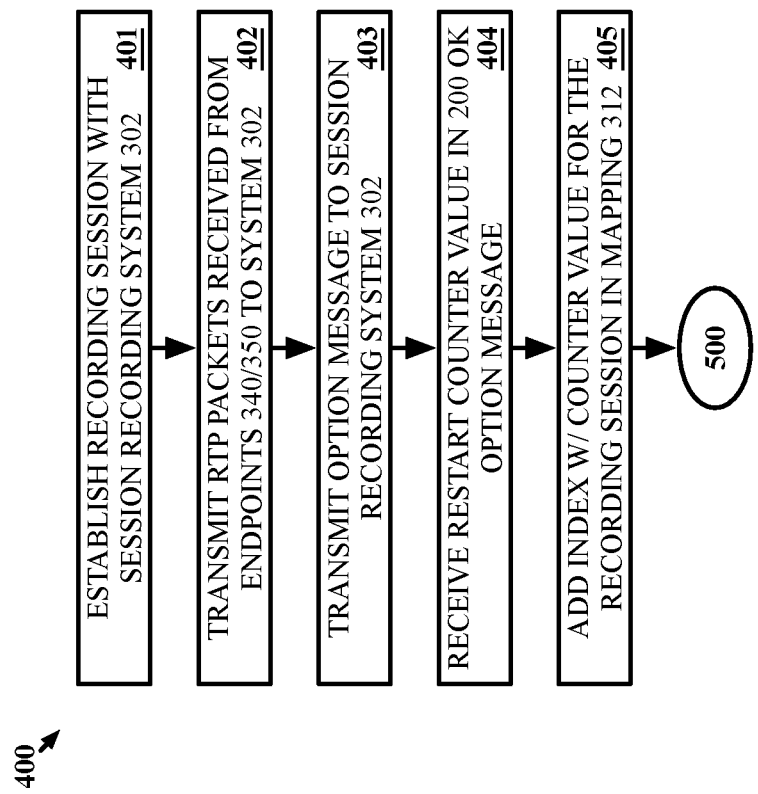
FIG. 4 illustrates an operation to provide call recording continuity upon restart of a call recording system.

FIG. 4 illustrates operation 400 to provide call recording continuity upon restart of a call recording system. In operation 400, a call communication session is established between endpoint 350 of endpoints 305 and endpoint 340 of endpoints 304 through session border controller 301. The user communications for the call are transmitted in packets using RTP between endpoint 340 and endpoint 350. Session recording client 311 establishes a SIPREC recording session with session recording system 302 (Step 401). Session recording client 311 may be configured to automatically record all calls or calls with certain characteristics or session recording client 311 may be manually triggered to record certain calls (e.g., the agent operating endpoint 340 in this example may direct session recording client 311 to record the call). Once the SIPREC recording session is established, session recording client 311 transmits the RTP packets received from endpoint 340 and endpoint 350 to session recording system 302 (Step 402). Session recording system 302 records the received RTP packets in a recording of communication session between endpoint 340 and endpoint 350. Session recording system 302 may also be generating recordings of communications between respective others of endpoints 304 and endpoints 305.

After establishing the recording session for the communication session between endpoint 340 and endpoint 350, session recording client 311 transmits a SIP OPTIONS message to session recording system 302, which indicates to session recording system 302 that session recording client 311 is requesting a restart counter value for session recording system 302 (Step 403). When session recording system 302 is operational, the SIP-defined response to a SIP OPTIONS message is a SIP OPTIONS 200 OK response message. In this case, the SIP OPTIONS 200 OK message will include a header with the requested restart counter value for session recording system 302. Session recording client 311 receives the SIP OPTIONS 200 OK message from session recording system 302 (Step 404). Session recording client 311 adds an index to mapping 312 (Step 405). The index includes an identifier for session recording system 302 and the restart counter value. The restart counter value is associated with the recording session in mapping 312. In some examples, session border controller 301 may already have other recording sessions established with session recording system 302. In those examples, an index with the restart counter value for session recording system 302 may already exist in mapping 312. In those examples, session recording client 311 may add an identifier for the present recording session in association with the already existing index. As such, mapping 312 includes an index indicating the restart counter value from session recording system 302 and associates that index with all active recording sessions of session recording system 302 having the index's restart counter value. Mapping 312 further includes other indexes, such as those for recording sessions established with session recording system 303. Thus, session recording client 311 can use mapping 312 to perform operations 400-600 for recording sessions with both session recording system 302 and session recording system 303.

Figure 5:
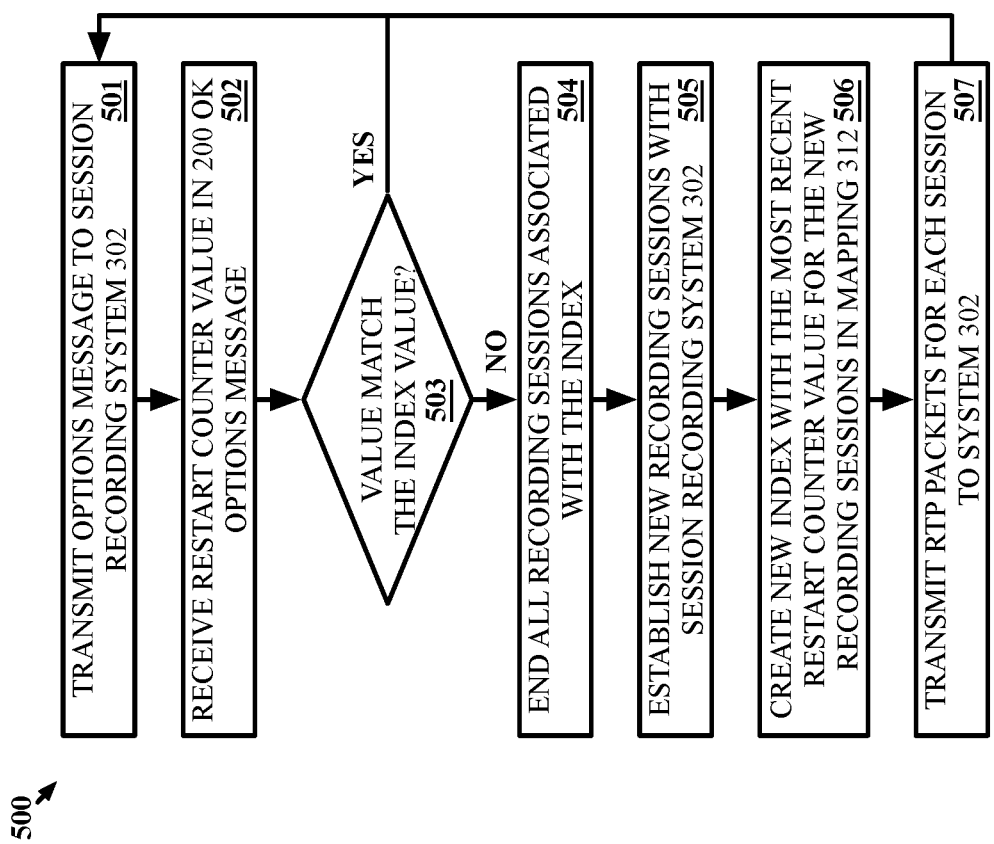
FIG. 5 illustrates an operation to provide call recording continuity upon restart of a call recording system.

FIG. 5 illustrates operation 500 to provide call recording continuity upon restart of a call recording system. Operation 500 begins where operation 400 left off. Session recording client 311 waits until a timer defining a period between SIP OPTIONS messages expires before transmitting another SIP OPTIONS message to session recording system 302 (Step 501). Session recording client 311 may send a single SIP OPTIONS message for all active recording sessions with session recording system 302 or may send one SIP OPTIONS message for each respective recording session. Session recording client 311 receives a SIP OPTIONS 200 OK response message from session recording system 302 in response to the SIP OPTIONS message (Step 502). The SIP OPTIONS 200 OK message includes the restart counter value of session recording system 302 when the SIP OPTIONS message from session recording client 311 was received by session recording system 302.

Session recording client 311 determines whether the restart counter value in the received SIP OPTIONS 200 OK message matches the restart counter value of the index in mapping 312 (Step 503). If the restart counter value still matches that of the index, session recording client 311 returns to step 501 where session recording client 311 again waits for the period timer to expire before transmitting another SIP OPTIONS message to session recording system 302. Steps 501-503 then repeat unless the most recently received restart counter value no longer matches the restart counter value in the index.

When the restart counter value does not match the value in the index, session recording client 311 ends all recording sessions associated with the index (Step 504). The recording sessions are ended because they are all no longer active with session recording system 302 based on session recording system 302 having restarted. There is no reason to keep sending RTP packets from the communication sessions associated with the recording sessions, including the RTP packets from the communication session between endpoint 340 and endpoint 350. However, session recording client 311 is configured to continue recording the communication sessions. Therefore, session recording client 311 establishes new recording sessions with session recording system 302 to replace the recording sessions associated with the index previous restart counter value (Step 505). In other examples, one or more of the new recording sessions may be established with session recording system 303 instead of session recording system 302.

Session recording client 311 creates a new index in mapping 312 indicating the new restart counter value and associating the new index with the new recording sessions (Step 506). Session recording client 311 also begins transmitting the RTP packets from the communication sessions associated with the new recording sessions to session recording system 302 (Step 507). After establishing the new communication sessions, session recording client 311 returns to step 501 by again transmitting a SIP OPTIONS message to session recording system 302 upon expiration of the period timer. Steps 501-503 again repeat but the restart counter values received from session recording system 302 are compared to the new index in mapping 312 rather than the previous index. In fact, session recording client 311 may delete the old index and recording session associated therewith, as it is no longer needed.

In examples where one or more of the new recording sessions were established with session recording system 303, session recording client 311 adds an index with the restart counter value for session recording system 303 to mapping 312 in association with the new recording sessions established therewith (or, if the index already exists for other sessions, identifiers for the new recording sessions with session recording system 303 are added to the existing index). Steps 501-503 are also performed between session recording client 311 and session recording system 303 to compare the restart counter values received from session recording system 303 to the value of the index for session recording system 303 in mapping 312.

Figure 6:
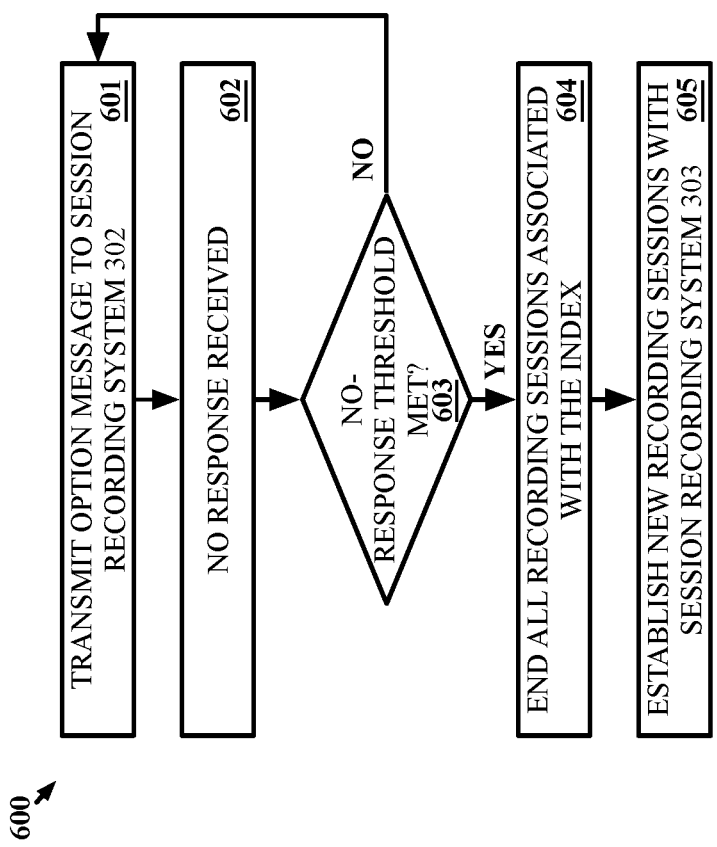
FIG. 6 illustrates an operation to provide call recording continuity upon restart of a call recording system.

FIG. 6 illustrates operation 600 to provide call recording continuity upon restart of a call recording system. Operation 600 is an example of actions session recording client 311 may take if a response is not received to a particular SIP OPTIONS message transmitted by session recording client 311. Operation 600 may, therefore, be performed in conjunction with operation 500 to handle scenarios where a response is not received at step 502. In operation 600, session recording client 311 transmits a SIP OPTIONS message to session recording system 302 (Step 601). Unlike in operation 500 where session recording client 311 receives a SIP OPTIONS 200 OK message in response to the SIP OPTIONS message at step 502, in operation 600 no response is received (Step 602). Session recording client 311 may determine that no response is received when no response is received prior to expirations of the timer indicating another SIP OPTIONS message should be transmitted. Other mechanisms for determining how long session recording client 311 should wait before determining that a response has not been received may also be used. Session recording client 311 may not receive a response because session recording system 302 is in the process of restarting (i.e., is not "OK" such that it can transmit a SIP OPTIONS 200 OK message). However, there are other reasons for why a response may not be received, such as the SIP OPTIONS message or the SIP OPTIONS 200 OK reply getting lost while traversing network 306.

To ensure the lack of receiving a response was not a fluke, session recording client 311 employs a threshold for the number of consecutive SIP OPTIONS messages sent for which no response is received. Session recording client 311 tracks the number of SIP OPTIONS messages sent without receiving a response and checks that number against the threshold (Step 603). If the threshold has not yet been met, session border controller 301 returns to step 601 to transmit another SIP OPTIONS message. If a SIP OPTIONS 200 OK response message is received, session recording client 311 may continue to step 502 of operation 500.

If the threshold is met, session recording client 311 assumes session recording system 302 has restarted and ends all recording sessions associated with the current index in mapping 312 (Step 604). While step 604 is similar to step 504 of operation 500, session recording client 311 assumes session recording system 302 is not presently operational in this example because session recording client 311 has not received the threshold number of responses. As such, session recording client 311 establishes new recording sessions with session recording system 303 to replace the ended sessions (Step 605). Session recording client 311 then performs operation 400 for the new recording sessions to create an index in mapping 312 for the new sessions using a restart counter value received from session recording system 303 (or adds identifiers to an existing index if one exists).

Figure 7:
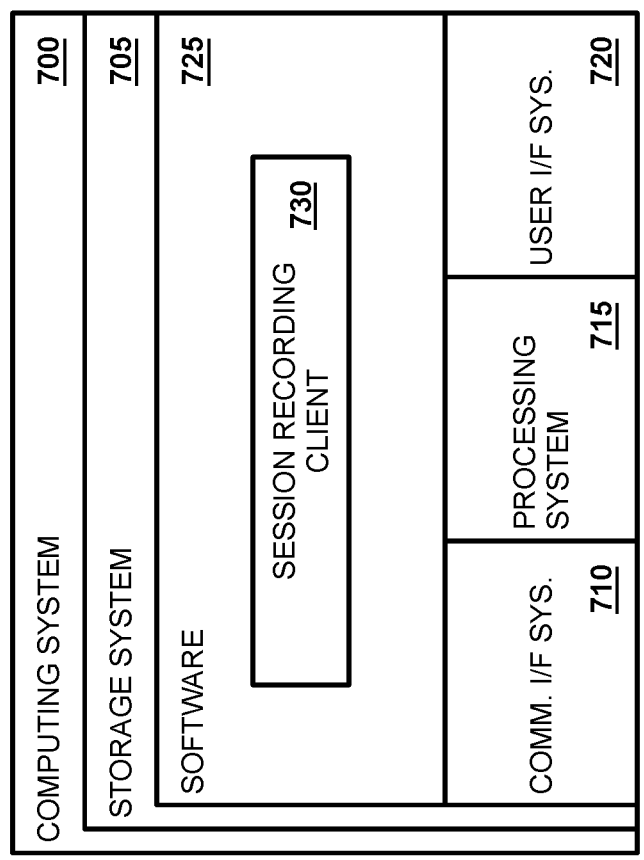
FIG. 7 illustrates a computing system for providing call recording continuity upon restart of a call recording system.

FIG. 7 illustrates a computing system 700 that is representative of any system or collection of systems in which the various processes, systems, programs, services, and scenarios disclosed herein may be implemented. Examples of computing system 700 include, but are not limited to, desktop computers, laptop computers, server computers, routers, web servers, cloud computing platforms, and data center equipment, distributed computing systems, as well as any other type of physical or virtual server machine, physical or virtual router, container, and any variation or combination thereof. It should be understood virtualized components are executing on physical hardware like that of computing system 700.

Computing system 700 may be implemented as a single apparatus, system, or device or may be implemented in a distributed manner as multiple apparatuses, systems, or devices. Computing system 700 may include, but is not limited to, processing system 715, storage system 705, software 725, communication interface system 710, and user interface system 720. Processing system 715 may be operatively coupled with storage system 705, communication interface system 710, and user interface system 720.

Processing system 715 may load and execute software 725 from storage system 705. Software 725 may include and implement session recording client 730, which may be representative of any of the operations for provide call recording continuity upon restart of a call recording system (e.g., operations 200 and 400-600). Accordingly, computing system 700 may be session recording client 101, session border controller 301, or may be a host system for a virtualized example of session recording client 101 or session border controller 301. Computing system 700 may also represent computing systems for session recording system 102, session recording system 302, and session recording system 303—including combinations thereof. When executed by processing system 715, software 725 may direct processing system 715 to operate as described herein for at least the various processes, operational scenarios, and sequences discussed in the foregoing implementations. Computing system 700 may optionally include additional devices, features, or functionality not discussed for purposes of brevity.

In some embodiments, processing system 715 may comprise a micro-processor and other circuitry that retrieves and executes software 725 from storage system 705. Processing system 715 may be implemented within a single processing device but may also be distributed across multiple processing devices or sub-systems that cooperate in executing program instructions. Examples of processing system 715 may include general purpose central processing units, graphical processing units, application specific processors, and logic devices, as well as any other type of processing device, combinations, or variations thereof.

Storage system 705 may comprise any memory device or computer readable storage media readable by processing system 715 and capable of storing software 725. Storage system 705 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a transitory form of signal transmission (often referred to as "signals per se"), such as a propagating electrical or electromagnetic signal or carrier wave.

In addition to computer readable storage media, in some implementations storage system 705 may also include computer readable communication media over which at least some of software 725 may be communicated internally or externally. Storage system 705 may be implemented as a single storage device but may also be implemented across multiple storage devices or sub-systems co-located or distributed relative to each other. Storage system 705 may comprise additional elements, such as a controller, capable of communicating with processing system 715 or possibly other systems.

Software 725 (including process 730 among other functions) may be implemented in program instructions that, when executed by processing system 715, direct processing system 715 to operate as described with respect to the various operational scenarios, sequences, and processes illustrated herein. For example, software 725 may include program instructions for establishing a recording session between a session recording client and a session recording system, wherein the recording session is associated with a communication session being recorded, periodically transmitting requests for counter values from the session recording system, wherein the counter value indicates a number of times the session recording system has restarted, receiving a first counter value of the counter values from the session recording system, receiving subsequent counter values of the counter values from the session recording system after receiving the first counter value, and, in response to determining that one of the subsequent counter values does not match the first counter value, ending the recording session.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 725 may include additional processes, programs, or components, such as operating system software, virtualization software, or other application software. Software 725 may also comprise firmware or some other form of machine-readable processing instructions executable by processing system 715.

In general, software 725 may, when loaded into processing system 715 and executed, transform a suitable apparatus, system, or device (of which computing system 700 is representative) overall from a general-purpose computing system into a special-purpose computing system customized to act, for example, as a slice breather or the like as described herein. Indeed, encoding software 725 on storage system 705 may transform the physical structure of storage system 705. The specific transformation of the physical structure may depend on various factors in different implementations of this description. Examples of such factors may include, but are not limited to, the technology used to implement the storage media of storage system 705 and whether the computer-storage media are characterized as primary or secondary storage, as well as other factors.

For example, if the computer readable storage media are implemented as semiconductor-based memory, software 725 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 710 may include communication connections and devices that allow for communication with other computing systems (not shown) over communication networks (not shown). Examples of communication connections and devices that together allow for inter-system communication may include network interface cards, antennas, power amplifiers, radio-frequency (RF) circuitry, transceivers, and other communication circuitry. The communication connections and devices may communicate over communication media to exchange communications with other computing systems or networks of systems, such as metal, glass, air, or any other suitable communication media.

Communication between computing system 700 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the only system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for maintaining call recording continuity when a recording system restarts, the method comprising:
in a session recording client:
establishing a recording session with a session recording system, wherein the recording session is established to record communications received by the session recording client, wherein the communications are exchanged between at least two endpoints over a communication session established between the at least two endpoints;
transmitting the communications to the session recording system over the recording session;
periodically transmitting requests for counter values to the session recording system, wherein each of the counter values indicates a number of times the session recording system has restarted;
receiving a first counter value of the counter values from the session recording system;
receiving subsequent counter values of the counter values from the session recording system after receiving the first counter value; and
in response to determining that one of the subsequent counter values does not match the first counter value, ending the recording session.

2. The method of claim 1, comprising:
in response to determining that the one of the subsequent counter values does not match the first counter value, establishing a new recording session associated with the communication session.

3. The method of claim 2, wherein the new recording session is established with another session recording system when the session recording system is not available.

4. The method of claim 1, wherein the requests comprise Session Initiation Protocol (SIP) OPTIONS messages and wherein the counter values are received in SIP 200 OK OPTION messages responsive to the SIP OPTIONS messages.

5. The method of claim 1, comprising:
after receiving the first counter value, adding an identifier for the recording session to a count mapping in association with an index comprising an identifier for the session recording system and the first counter value.

6. The method of claim 5, wherein adding the identifier comprises:
adding the index to the count mapping in response to determining the count mapping does not include the index.

7. The method of claim 5, wherein the index is associated with one or more other recording sessions between the session recording client and the session recording system.

8. The method of claim 7, comprising:
in response to determining the one of the subsequent counter values does not match the first counter value of the index, initiating new recording sessions with a new session recording system to replace the recording session and the other recording sessions;
adding a new index to the count mapping, wherein the new index comprises an identifier for the new recording system and a new counter value received for the new recording system; and
associating the new recording sessions with the new index.

9. The method of claim 8, comprising:
deleting the index from the count mapping.

10. The method of claim 1, comprising:
establishing the communication session between a first endpoint and a second endpoint through the session recording client, wherein Real-time Transport Protocol (RTP) packets are exchanged over the communication session between the first endpoint and the second endpoint; and forwarding the RTP packets from the session recording client to the session recording system over the recording session.

11. An apparatus to maintain call recording continuity when a recording system restarts, the apparatus comprising:
one or more computer readable storage media;
a processing system operatively coupled with the one or more computer readable storage media; and
program instructions stored on the one or more computer readable storage media that, when read and executed by the processing system, direct the apparatus to:
establish a recording session with a session recording system, wherein the recording session is established to record communications received by the apparatus, wherein the communications are exchanged between at least two endpoints over a communication session established between the at least two endpoints;
transmitting the communications to the session recording system over the recording session;
periodically transmit requests for counter values from the session recording system, wherein each of the counter values indicates a number of times the session recording system has restarted;
receive a first counter value of the counter values from the session recording system;
receive subsequent counter values of the counter values from the session recording system after receiving the first counter value; and
in response to determining that one of the subsequent counter values does not match the first counter value, end the recording session.

12. The apparatus of claim 11, wherein the program instructions direct the processing system to:
in response to determining that the one of the subsequent counter values does not match the first counter value, establish a new recording session associated with the communication session.

13. The apparatus of claim 12, wherein the new recording session is established with another session recording system when the session recording system is not available.

14. The apparatus of claim 11, wherein the requests comprise Session Initiation Protocol (SIP) OPTIONS messages and wherein the counter values are received in SIP 200 OK OPTION messages responsive to the SIP OPTIONS messages.

15. The apparatus of claim 11, wherein the program instructions direct the processing system to:
after receiving the first counter value, add an identifier for the recording session to a count mapping in association with an index comprising an identifier for the session recording system and the first counter value.

16. The apparatus of claim 15, wherein to add the identifier, the program instructions direct the processing system to:
add the index to the count mapping in response to determining the count mapping does not include the index.

17. The apparatus of claim 15, wherein the index is associated with one or more other recording sessions with the session recording system.

18. The apparatus of claim 17, wherein the program instructions direct the processing system to:
in response to determining the one of the subsequent counter values does not match the first counter value of the index, initiate new recording sessions with a new session recording system to replace the recording session and the other recording sessions;
add a new index to the count mapping, wherein the new index comprises an identifier for the new recording system and a new counter value received for the new recording system; and
associate the new recording sessions with the new index.

19. The apparatus of claim 11, wherein the program instructions direct the processing system to:
establish the communication session between a first endpoint and a second endpoint through the apparatus, wherein Real-time Transport Protocol (RTP) packets are exchanged over the communication session between the first endpoint and the second endpoint; and
forward the RTP packets to the session recording system over the recording session.

20. One or more computer-readable storage media having program instructions stored thereon for maintaining call recording continuity when a recording system restarts, the program instructions, when read and executed by a processing system, direct the processing system to:
establish a recording session with a session recording system, wherein the recording session is established to record communications received from at least two endpoints, wherein the communications are exchanged between the at least two endpoints over a communication session established between the at least two endpoints;
transmit the communications to the session recording system over the recording session;
periodically transmit requests for counter values from the session recording system, wherein each of the counter values indicates a number of times the session recording system has restarted;
receive a first counter value of the counter values from the session recording system;
receive subsequent counter values of the counter values from the session recording system after receiving the first counter value; and
in response to determining that one of the subsequent counter values does not match the first counter value, end the recording session.

* * * * *